United States Patent [19]

Focke et al.

[11] Patent Number: 4,840,010
[45] Date of Patent: Jun. 20, 1989

[54] DEVICE FOR ACTUATION OF SEALING JAWS OF A PACKAGING MACHINE

[75] Inventors: Heinz Focke, Verden; Hans Jürgen Bretthauer, Bremen, both of Fed. Rep. of Germany

[73] Assignee: Focke & Co. (GmbH & Co.), Verden, Fed. Rep. of Germany

[21] Appl. No.: 111,534

[22] Filed: Oct. 23, 1987

[30] Foreign Application Priority Data

Oct. 24, 1986 [DE] Fed. Rep. of Germany ....... 3636241

[51] Int. Cl.⁴ .............................................. B65B 51/14
[52] U.S. Cl. ......................................... 53/375; 53/575
[58] Field of Search ................... 53/234, 575, 375, 373

[56] References Cited

U.S. PATENT DOCUMENTS 3,903,672  9/1975  Goglio ............................. 53/373 X
4,183,191  6/1980  Focke ................................... 53/234
4,617,784 10/1986  Golicz ............................ 53/373 X

FOREIGN PATENT DOCUMENTS 2128543  5/1984  United Kingdom ................. 53/375

*Primary Examiner*—John Sipos
*Attorney, Agent, or Firm*—Sughrue, Mion, Zinn, Macpeak & Seas

[57] ABSTRACT

In the actuation of sealing jaws (12) for sealing of folding flaps of packages in conjunction with packaging machines, an active period of the sealing jaws independent of the working speed (rate of cycling) of the packaging machine is obtained by an actuating means (cam rocker 16), which is set off during each operating cycle of the packaging machine by a driving means with an accurately defined driving phase (stepping motor 23).

6 Claims, 2 Drawing Sheets

DEVICE FOR ACTUATION OF SEALING JAWS OF A PACKAGING MACHINE

BACKGROUND OF THE INVENTION

The invention relates to a device for control of the pressing period and for actuation of sealing jaws in conjunction with a packaging machine, especially for sealing of folding flaps of a packaging unit.

Packaging machines are provided with welding or sealing means, namely sealing jaws, if objects are to be wrapped in sealable foils or in packaging material provided with a sealable coating. In the manufacture of cigarette packets, one has to seal their outer wrapping of thermally-weldable foil, in the region of end faces, so that overlapping folding flaps are fixed together. For this purpose (heated) sealing jaws are installed, which maintain contact with the surfaces of the packets, i.e. of the folding flaps, during a defined time.

In order on the one hand to achieve sufficiently durable sealing of the folding flaps, but on the other hand to avoid damage to the foil by over-long action by the heated sealing jaws, it is necessary to control the pressing period of the sealing jaws accurately. The maintenance of exact, uniform sealing periods with predetermined pressure and specified temperature of the sealing jaws is made difficult in that the packages to be acted on may be transported with differing speeds. The reasons for this are variations in the cycle time, or number, of the packaging machine. Fundamentally, there are at least three different working regimes of the packaging machine which can be met in practice: the normal speed corresponds to the nominal output of the packaging machine, with cigarette packets e.g. 400 cycles per minute. For doing work on the packaging machine, especially for the removal of defective packets etc., a crawling speed is provided, in which the packaging machine runs with markedly reduced cycle number, e.g. at 200 cycles per minute. Then packaging machines are provided with a so-called overdrive, which provides cycle numbers above the normal speed for short periods.

SUMMARY OF THE INVENTION

Arising from this, the object underlying the invention is to propose means which ensure a uniform pressing period suiting the prevailing requirements, and consequently a sealing period of the welding or sealing jaws independent of the cycle number of the packaging machine.

To meet this purpose, the device according to the invention is characterized in that an acuating means for the sealing jaws is driven once or several times during each working cycle of the packaging machine, by a driving means with uniform driving period.

According to the concept of the invention, the actuating means for the sealing jaws, or for a driving member for them, is so actuated that the pressing period of the sealing jaws is always uniform, but nevertheless the start of a pressing period of the sealing jaws is (indirectly) initiated by the packaging machine.

Preferably the sealing jaws or their actuating means are driven by a motor which can be adjusted to an accurately limited driving period, especially by a stepping motor its whole revolution corresponding to one driving period for the actuating means of the sealing jaws.

One driving period (revolution) of the stepping motor can correspond to the pressing period of the sealing jaws. But more advantageous is a solution in which the actuating means for the sealing jaws is so formed that during one driving period of the driving means (stepping motor) the sealing jaws assume the pressing position (sealing position) only temporarily.

According to the invention, the driving means for the sealing jaws or their actuating member is triggered, i.e. set in motion, by the packaging machine. For this purpose, according to a preferred embodiment, a switching member is arranged on a machine shaft of the packaging machine, and rotates with it, especially a switch disc with a switching pin for activating an initiator which in its turn starts the stepping motor.

The actuating means for the sealing jaws can be made in various ways. What is particularly advantageous is a (two-armed) cam rocker, which is driven oscillatingly by a crank mechanism, the crank mechanism being rotated by the stepping motor. The cam rocker is provided with a cam profile which acts on the sealing jaws via a follower means (follower roller). The cam rocker or its cam profile is so formed that in the course of one oscillation to and fro, which preferably corresponds to a whole revolution of the stepping motor, the sealing jaws are held in the sealing position during a period which is exactly predetermined in duration, but during the remaining time they are held in the withdrawn position.

One embodiment of the invention is described in more detail below with reference to the drawings. These show:

DETAILED DESCRIPTION OF A PREFERRED EMBODIMENT

The device shown in used in connection with a packaging machine for rectangular packages, especially cigarette packets 10. One is concerned here with the sealing of folding flaps of an outer wrapper of sealable foil on the cigarrette packets 10. The folding flaps (not shown in detail) are in the region of end faces 11 of the cigarette packets 10. In the present case these are transported step by step on a (horizontally running) conveyor ers, that is with each two cigarette packets 10 on top of one another. The end faces 11 with the folding flaps which are to be sealed are directed to the side. During a stationary phase of the cigarette packets 10, the folding flaps of the outer wrapper are sealed by the application of heat and pressure. The construction and operation of the conveyor belt for the cigarette packets 10 are generally known in conjunction with packaging machines for cigarettes.

Figure 1:
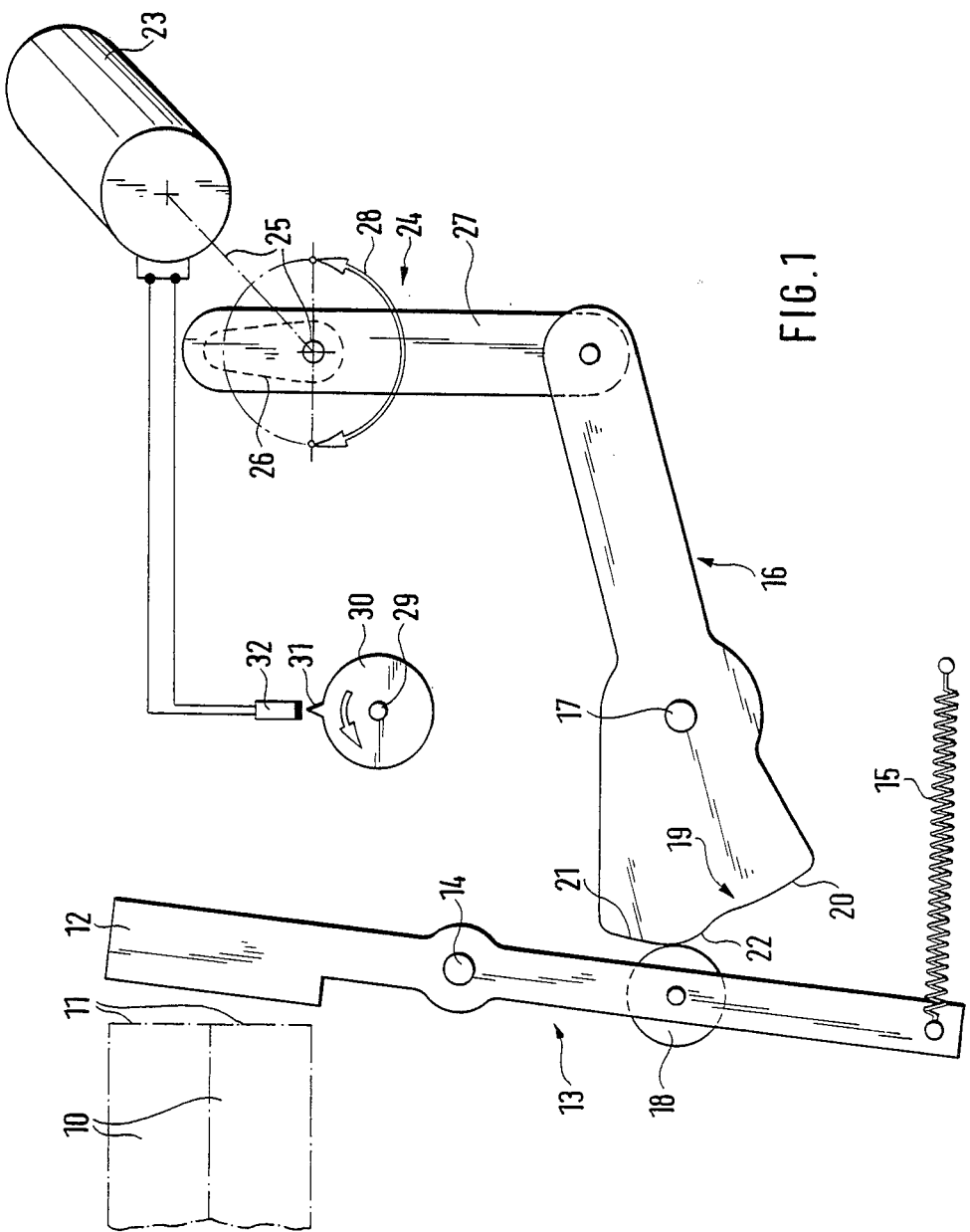
FIG. 1 a drive for the actuation of sealing jaws, in schematic side view.
Figure 2:
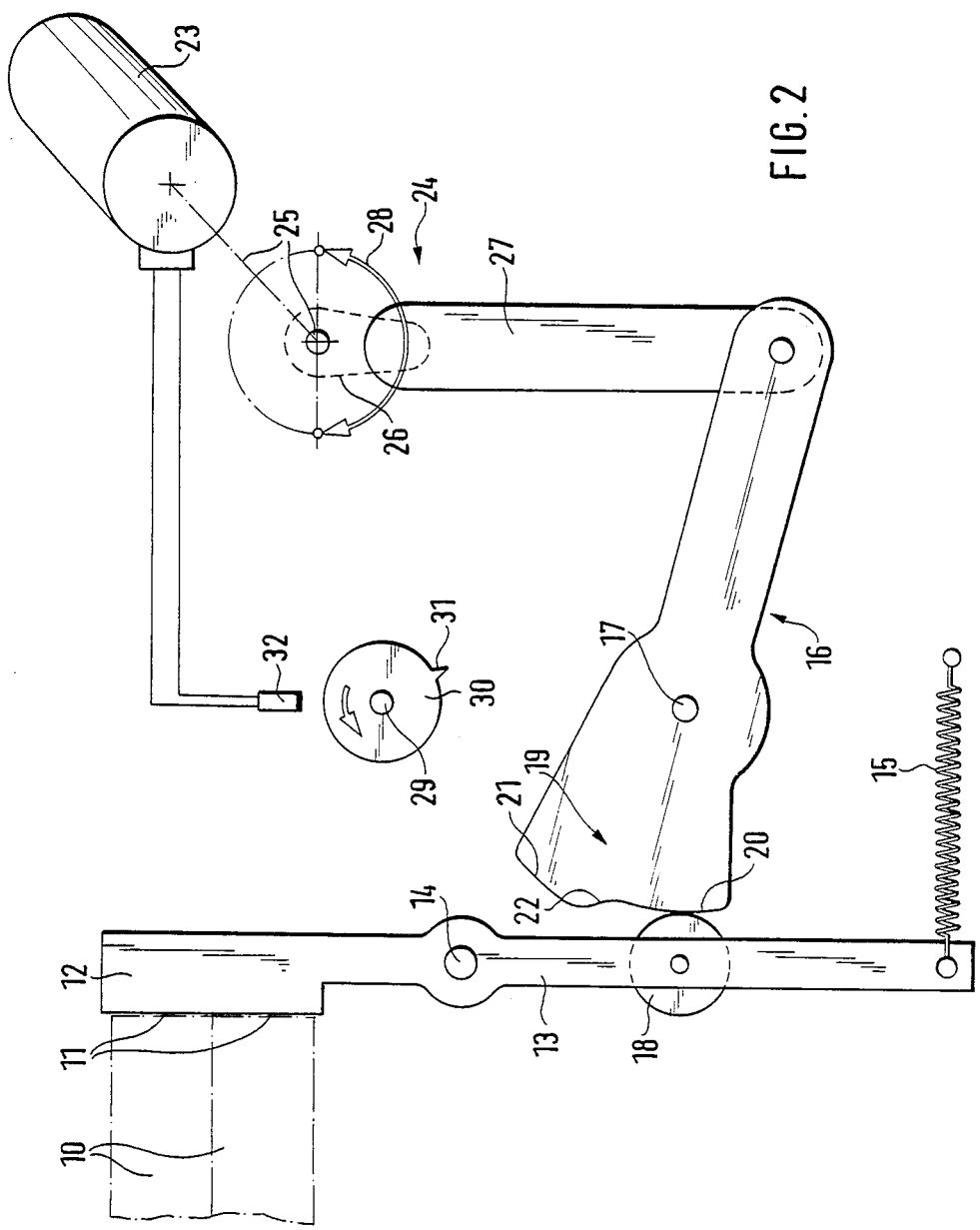
FIG. 2 the drive according to FIG. 1 in another position (sealing position).

For the sealing of the folding flaps of each two superimposed cigarette packets, heated sealing jaws 12, correspondingly dimensioned, are provided in this embodiment. These jaws can be moved by a swinging movement from a withdrawn position (FIG. 1) into the sealing position (FIG. 2) with engagement against the end faces 11 of the cigarette packets 10.

For this purpose, the sealing jaws 12 in this embodiment are mounted on a two-armed pressure lever 13.

The upright pressure lever 13 is pivoted at a fixed point by a pivot bearing 14.

The sealing jaws 12 and their pressure lever 13 are continuously urged towards the sealing position (FIG. 2) by a resilient pressure means. In the present case, for this purpose, a tension spring 15 is applied to the lower, free end of the pressure lever 13, and this spring urges the pressure lever 13 in the counterclockwise direction, i.e. in the direction towards the sealing position according to FIG. 2.

The sealing jaws are applied by an actuating means, which in the embodiment shown is formed as a two-armed cam rocker 16. This is likewise pivoted at a fixed point, and swivels to and fro in a vertical plane about a bearing 17. The cam rocker 16 acts on the pressure lever 13, that is on the lower part of the latter. If the cam rocker 16 is swivelled to and fro, or up and down, a follower roller 18 mounted rotatably on the pressure lever 13 runs on a control cam 19 formed on the outer, free end of the cam rocker 16.

The control cam 19 is formed in a particular way. A lower zone is constituted as a depression 20 and an upper part as an elevation, i.e. as a radial projection 21. Between the two zones of the control cam 19 there is a curved transition 22. The depression 20 and the projection 21 are so formed, i.e. have such a distance from the bearing 17, that the sealing jaws are in the sealing position when the follower roller 18 is resting on the control cam 19 in the zone of the depression 20. When the follower roller 18 is in the zone of the projection 21, the sealing jaw 12 is swung back, and thus is out of the sealing position.

The cam rocker 16 is moved by a precisely operating driving means, which accurately determines the duration of a to and fro movement. In it, the period of pressure of the sealing jaws 12 on the cigarette packets 10 is determined by the length (circumferential measurement) of the depression 20. When, as a result of relevant movement of the cam rocker 16, the follower roller 18 leaves the zone of the depression 20, the sealing phase is finished.

In the embodiment shown, the cam rocker 16 is driven by a stepping motor 23 through a transmission, that is via a crank mechanism 24. A crank arm 26 is mounted on and rotates with a crankshaft 25 which is fixed in position. This crank arm 26 drives a connecting rod 27 which is pivotally connected with the free end of the cam rocker 16. The crankshaft 25 is driven by the stepping motor 23.

In the present embodiment, the crank mechanism 24 is so arranged that the cam rocker 16 performs a complete to and-fro, or up-and-down, movement during a complete rotation of the crankshaft 25 and hence of the crank arm 26. This movement is completed within an operating cycle of the packaging machine. The movement of the cam rocker 16 can be started at the very beginning of an operating cycle of the packaging machine, and in an extreme case, e.g. at overdrive speed, can finish with it. But the action of the cam rocker 16, and hence the movement of the sealing jaws 12, can occur staggered in time within one operating cycle of the packaging machine. The moving, i.e. driving, period of the stepping motor 23, preferably adjustable, is uniform. In the present embodiment, the sealing jaw 12 is held in the sealing position (FIG. 2) during half a revolution of the connecting rod (27) (Phase of movement corresponding to arrow 28).

Acting as the driving means for the cam rocker 16, the stepping motor 23 is set in motion by the packaging machine. In the embodiment shown, there is for this purpose a switching means in the form of a rotating switch disc 30, mounted on a machine shaft 29 which suitably rotates exactly in time with the packaging machine. Mounted on this disc 30 is a switching pin 31 projecting in a radial direction, which cooperates with a switching means, namely an initiator 32. This again in connected by a circuit with the stepping motor 23, so that, on activation of the initiator 32 by the switching device 31, the stepping motor 23 is switched on. The swung-back condition of the sealing jaws 12 is determined by the zone of rotation of the crank mechanism 24 outside the arrow 28 and by the duration of the working cycle of the packaging machine up to the next switching pulse. The actuating means for the sealing jaws 12 can also be made otherwise, e.g. as a rotating cam disc, which can even be driven directly by the stepping motor. An actuating means in the form of a reciprocating rod is also possible.

We claim:

1. Device for control of a pressing period and for actuation of sealing jaws in conjunction with a packaging machine, particularly for sealing of folding flaps of a package, said device comprising: rotatably driven actuating means for the sealing jaws; driving means having a uniform driving period and operable to drive said actuating means; and follower means for transferring the movement of said actuating means to the sealing jaws; wherein said actuating means comprises a driven cam rocker (16), movable to and fro while engaging the follower means; and wherein said driving means (23) comprises a rotatable crank mechanism (24), coupled to said cam rocker (16), for moving said cam rocker through one oscillation, to and from, during a whole revolution of the crank mechanism (24), thereby temporarily to move the sealing jaws (12) into a sealing position once or several times during each working cycle of the packaging machine; and wherein said follwer means has a follower element (18) on the sealing jaws, and wherein said cam rocker (16) has an irregular cam track (19) which acts on said follower element (18) to actuate the sealing jaws (12) and thereby determine the pressing period of the sealing jaws (12).

2. Device according to claim 1, further comprising tension spring means (15) for urging the sealing jaws (12)into the sealing position from which the jaws (12) are movable by the cam rocker (16).

3. Device according to claim 1, further comprising machine shaft means (29), synchronously rotating in step with the packaging machine, for starting the operation of said driving means (23) to move said cam rocker (16).

4. Device according to claim 3, further comprising controllable initiator means (32) for starting said driving means (23), said initiator means (32) comprising a control disc mounted on said machine shaft means (29) and having a radially extending control pin means (31) for engaging and controlling said initiator means (32).

5. Device according to claim 1, wherein said driving means comprises a stepping motor (23) which rotates with uniform speed and one whole revolution of which corresponds to one driving period of said actuating means (16) for the sealing jaws (12).

6. Device according to claim 1, wherein said cam rocker (16) moves the sealing jaws (12) into the sealing position during a fraction of the driving period of the driving means (23), and out of the sealing position during the remaining time of a working cycle of the packaging machine.

* * * * *